US011105921B2

(12) United States Patent
Birkedahl et al.

(10) Patent No.: US 11,105,921 B2
(45) Date of Patent: Aug. 31, 2021

(54) SYSTEMS AND METHODS FOR VEHICLE NAVIGATION

(71) Applicant: Honeywell International Inc., Morris Plains, NJ (US)

(72) Inventors: Byron Birkedahl, Glendale, AZ (US); Marc M. Pos, Duvall, WA (US)

(73) Assignee: Honeywell International Inc., Charlotte, NC (US)

( * ) Notice: Subject to any disclaimer, the term of this patent is extended or adjusted under 35 U.S.C. 154(b) by 381 days.

(21) Appl. No.: 16/279,817

(22) Filed: Feb. 19, 2019

(65) Prior Publication Data
US 2020/0264301 A1 Aug. 20, 2020

(51) Int. Cl.
G01S 13/933 (2020.01)
G01C 21/00 (2006.01)
G01S 19/46 (2010.01)
G08G 5/04 (2006.01)
G01S 13/931 (2020.01)

(52) U.S. Cl.
CPC .......... *G01S 13/933* (2020.01); *G01C 21/005* (2013.01); *G01S 19/46* (2013.01); *G08G 5/045* (2013.01); *G01S 2013/9322* (2020.01)

(58) Field of Classification Search
CPC ............... G01S 13/933; G01S 19/46; G01S 2013/9322; G01C 21/005; G08G 5/045
See application file for complete search history.

(56) References Cited

U.S. PATENT DOCUMENTS

| 6,512,976 | B1 | 1/2003 | Sabatino et al. |
| 8,296,056 | B2 | 10/2012 | Becker et al. |
| 8,633,851 | B2 | 1/2014 | Vacanti et al. |
| 9,738,401 | B1 | 8/2017 | Holt et al. |
| 10,019,907 | B2 | 7/2018 | Kanade et al. |
| 10,573,024 | B1* | 2/2020 | Cui ........................ H04N 5/332 |
| 2007/0106473 | A1 | 5/2007 | Bodin et al. |
| 2010/0268458 | A1 | 10/2010 | Becker et al. |
| 2016/0068267 | A1* | 3/2016 | Liu ....................... G05D 1/0061 701/11 |
| 2017/0186329 | A1* | 6/2017 | Gao ...................... G08G 5/0034 |

(Continued)

OTHER PUBLICATIONS

European Patent Office, "Extended European Search Report from EP Application No. 19220085.5", from Foreign Counterpart to U.S. Appl. No. 16/279,817, dated Jul. 7, 2020, pp. 1 through 8, Published: EP.

(Continued)

Primary Examiner — Hussein Elchanti
(74) Attorney, Agent, or Firm — Fogg & Powers LLC

(57) ABSTRACT

Techniques for allowing a vehicle to detect and avoid obstacles comprises at least one radar and a navigation system including a three-dimensional map database. The at least one radar generates radar return image(s) which can be compared by the navigation system to the three-dimensional map to determine a three-dimensional position of the vehicle. Based upon position determination, the navigation system can guide the vehicle to a destination whilst avoiding obstacles. If the vehicle also includes a Global Navigation Satellite System (GNSS) receiver, such techniques are desirable when the GNSS receiver is unable to provide accurate position data, which can occur in urban environments where obstacles are numerous.

17 Claims, 3 Drawing Sheets

(56) References Cited

U.S. PATENT DOCUMENTS

| | | | |
|---|---|---|---|
| 2017/0201614 A1* | 7/2017 | Deng | G06F 16/217 |
| 2018/0102058 A1* | 4/2018 | Cao | G08G 5/0034 |
| 2018/0102831 A1* | 4/2018 | Murphy | H04W 64/00 |
| 2018/0196435 A1 | 7/2018 | Kunzi et al. | |
| 2018/0204469 A1 | 7/2018 | Moster et al. | |
| 2018/0259641 A1 | 9/2018 | Vacanti | |
| 2019/0050000 A1* | 2/2019 | Kennedy | G06T 7/277 |
| 2019/0129039 A1* | 5/2019 | Schubert | G08G 5/006 |
| 2020/0034646 A1* | 1/2020 | Ding | G06K 9/3241 |
| 2020/0072624 A1* | 3/2020 | Kuzmanovic | G01C 21/3691 |

OTHER PUBLICATIONS

Perez-Grau, et al., "An architecture for robust UAV navigation in GPS-denied areas", Journal of Field Robotics, Oct. 11, 2017, pp. 121-145, Wiley Periodicals, Inc.
European Patent Office, "Communication pursuant to Article 94(3) EPC from EP Application No. 19220085.5", from Foreign Counterpart to U.S. Appl. No. 16/279,817, dated Nov. 25, 2020, pp. 1 through 5, Published: EP.

* cited by examiner

SYSTEMS AND METHODS FOR VEHICLE NAVIGATION

BACKGROUND

Emerging technology allows for the operation of vehicles (e.g. air taxis, delivery drones) which require a reliable, safe and precise means for navigating with primary position information, such as provided by a global navigation satellite system (GNSS) receiver. In an urban environment, a GNSS receiver may provide uninterrupted position information but with degraded accuracy e.g. due to some GNSS signals being erroneous due to, or blocked by, structures, or may be unable to provide any position information at all, e.g. due to GNSS receiver failure, spoofing, jamming, multipath cancelling, or GNSS signal suppression. For example, many structures within an urban environment have reflective properties, which can reflect GNSS signals and cause a GNSS receiver to generate erroneous data.

For vehicles operating in urban environments, especially airborne vehicles, even a momentary false determination of position or loss of primary position information can lead to a collision with structures within the urban environment. Thus, vehicles traversing urban environments require uninterrupted, accurate position data to operate in an urban environment.

While the aforementioned problem can occur when a human operates a vehicle, the problem is can be more acute for an autonomous vehicle. In some cases, autonomous vehicles lack secondary systems (in addition to a GNSS receiver) for determining their position. Moreover, some autonomous vehicles cannot determine when their GNSS receiver generates inaccurate position data, e.g. due to multipath of satellite signals arising from obstacles such as buildings. When an autonomous vehicle cannot determine its location, the vehicle will not be able to properly land and may run out of power attempting to determine its position.

One often used secondary system for position determination is an inertial measurement unit (IMU). An IMU determines location based upon measuring linear accelerations and rotation rates. IMUs having high precision are cost prohibitive for low cost autonomous vehicles. Therefore, there is a need for a low cost and reliable alternate for determining vehicle position.

SUMMARY

A method is provided. The method comprises: projecting at least one directional beam from at least one phased array radar, where a radar signal is emitted and a radar return signal may be received in each directional beam; generating at least one radar return image from at least one radar return signal; correlating the radar return image with a three-dimensional map database; and determining at least one of a three-dimensional position and a velocity of a vehicle based upon the correlation.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electric changes may be made.

Figure 1:
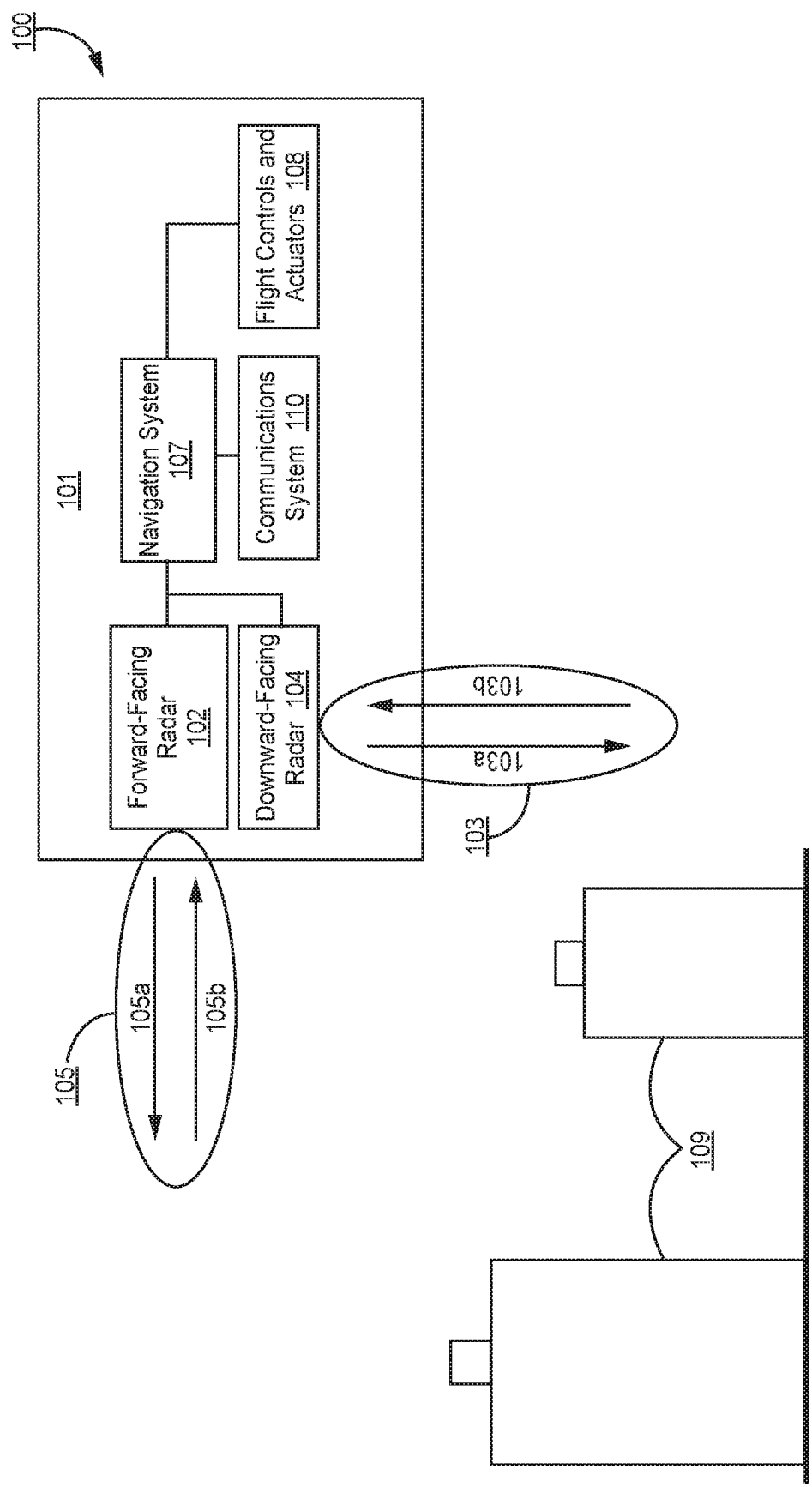
FIG. 1 is a diagram illustrating an example navigation system within a vehicle in an urban environment.

FIG. 1 is a diagram of one example of a vehicle 101 with a navigation system 107 and at least one radar in an urban environment 100. For pedagogical purposes, the vehicle 101 illustrated herein is an autonomous airborne vertical takeoff and landing vehicle, such as an airborne drone; however, the vehicle 101 may be any other type of vehicle including without limitation a spaceborne or terrestrial vehicle. Such other types of vehicles may be non-airborne vehicles (including drones). The vehicle 101 includes at least one radar, e.g. a forward-facing radar.

For pedagogical purposes, two radars will be illustrated: a forward-facing radar 102 and a downward-facing radar 104. The forward-facing radar 102 generates information, e.g. about obstacles such as structures, in front of the vehicle 101. The downward-facing radar 104 generates information, e.g. about obstacles such as structures, below the vehicle 101. Such information can be used by the vehicle 101 to avoid collisions with obstacles 109, e.g. in an urban environment.

Obstacles 109 include stationary obstacles (e.g. structures such as building(s) and tree(s)) and moving obstacles (e.g. other vehicle(s)). Optionally, the vehicle 101 can travel autonomously under control of the navigation system 107. With knowledge of the location of these obstacles 109, the navigation system can re-route the vehicle 101 to avoid collision with the obstacles 109.

However, in some examples one or more radars can be employed in the vehicle 101 facing directions other than forward- or downward-facing. The one or more radars may be collectively referred to as "radars". Multiple radars may be used to increase the field of regard, e.g. up to 360°. Such radars can be mounted on and/or in the vehicle 101. Description of the forward-facing radar 102 and the downward-facing radar 104 applies to all radars employed in the vehicle 101.

The forward-facing radar 102 and the downward-facing radar 104 are configured to emit radar signals and to receive return radar signals. The radar signals reflect off objects in the environment. The reflectivity of an object depends on many factors including the shape of the object, the material of the object, and the proximity of different materials. The reflected return radar signals from the radars 102, 104 can be used to determine the three-dimensional position of objects within a field of regard of a radar based upon the intensity of the return radar signal, beam direction, and the delay of return signals with the corresponding radar signals. Some aspects of an obstacle 109, such as a corner of a building, will be more readily identifiable than other aspects, such as a flat window pane. Thus, certain features of objects within an urban environment will be more identifiable than others.

In the example shown in FIG. 1, the forward-facing radar 102 is mounted on, e.g. the front of, the vehicle 101 such that the forward-facing radar 102 provides a radar return image of a volume in front of the vehicle 101. The forward-facing radar 102 is configured to emit radar signals in at least one directional beam. In some examples, forward-facing radar 102 is configured to emit at least one narrow beam radio signal and receive a corresponding reflected radio signal in each of the at least one narrow beams. For example, a downward directional beam 105 would be scanned, e.g. electronically, across a wide, e.g. a hemispherical volume, in front of the vehicle 101. In a forward directional beam 105, a forward radar signal 105a is transmitted, and a forward return signal 105b is received if the forward radar signal 105a is reflected from an obstacle 109 upon which the forward radar signal 105a impinges. In some examples, the forward-facing radar 102 is configured to emit and receive radio signals, in at least one beam. One or more beams are scanned, e.g. electronically, to image obstacles 109 within a volume in front of the vehicle 101.

In the example shown in FIG. 1, the downward-facing radar 104 is mounted on, e.g. the bottom of, the vehicle 101 such that the downward-facing radar 104 provides a radar return image of a volume below the vehicle 101. The downward-facing radar 102 is configured to emit radar signals in at least one directional beam. In some examples, downward-facing radar 104 is configured to emit at least one narrow beam radio signal, and receive a corresponding reflected radio signal in each of the at least one narrow beams. For example, a downward directional beam 103 would be scanned, e.g. electronically, across a wide, e.g. a hemispherical volume, in front of the vehicle 101. In the downward directional beam 103, a downward radar signal 103a is transmitted, and a downward return signal 103b is received if the downward radar signal 103a is reflected from an obstacle 109 upon which the downward radar signal 103a impinges. In some examples, the downward-facing radar 104 is configured to emit and receive radio signals, in at least one beam. One or more beams are scanned, e.g. electronically, to image obstacles 109 within a volume below the vehicle 101.

As a result, each radar generates a radar return image for an instant in time or a time period. Each radar return image identifies obstacles 109 in the image and the three-dimensional position of the reflective surfaces of each of such obstacles 109 relative to the vehicle 101. For non-airborne vehicles, the downward-facing radar 104 may be absent or configured to face in another direction.

In some examples, each radar is a phased-array radar, a Synthetic Aperture Radar (SAR) or an Inverse SAR. A phased-array radar may be implemented as described in U.S. Pat. No. 8,633,851 (the '851 Patent), issued Jan. 21, 2014, which is herein incorporated by reference in its entirety. A phased-array radar is suitable for vehicles because it can electronically scan a volume, and thus does not require heavy and bulky mechanical scanning hardware.

The phased-array radar described in the '851 Patent includes multiple radar units, a clock, and a processing system. The radar signal transmitted by each radar units is phased locked to a clock. Each radar unit can subsequently adjust the phase and amplitude of its transmitted radar signal. By doing so, the phased-array radar can be tailored to emit one or more beams and scan the one or more beams.

SAR or ISAR system utilizes a single non-scanning radar on a vehicle and the motion of respectively the vehicle or target to produce a detailed image, e.g. of the urban environment. The resulting radar images provide a three-dimensional image of the radar returns through computation. In some examples, the SAR and ISAR radars process the radar return signals and provide the navigation system 107 with a radar return image. In other examples, the radar return signals described herein are provided to the navigation system 107 and the navigation system 107 is configured to process the radar return signals into a radar return image.

In one example, the forward-facing radar 102 and the downward-facing radar 104 are each implemented as scanning radar, e.g. phased-array radar. In such an example, the forward-facing radar 102 emits one or more beams which scan a region in front of the vehicle 101 to generate a forward radar return image derived from the forward return signal 105b; the downward-facing radar 104 emits one or more beams which scan a region below the vehicle 101 to generate a downward radar return image derived from the forward return signal 103b.

In the example shown in FIG. 1, the navigation system 107 is configured to receive forward and downward radar return images from the forward-facing radar 102 and the downward-facing radar 104. In some examples, the navigation system 107 is configured to include a three-dimensional map database. In some examples, the navigation system 107 is configured to receive information from other components of the navigation system 107 (e.g. a GNSS system, an altimeter, and/or an attitude and heading reference system (AHRS)). In the example shown in FIG. 1, the navigation system 107 is configured to determine three-dimensional position and velocity of the vehicle 101. Furthermore, the navigation system 107 is coupled to flight controls and actuators of the vehicle 101.

In some embodiments, the radar return image(s), each of which may identify one or more obstacles 109, are compared to a three-dimensional map database stored within the vehicle 101; alternatively, the three-dimensional map database may be stored off the vehicle 101 (e.g. in a cloud computing system) and accessed remotely through a communications system 110 on the vehicle. Reflective features, e.g. corners, sharp angles, or certain materials, can be overlaid on a high-resolution ground map or image. Using image processing techniques, e.g. edge detection, the reflective features of radar return image(s) can be aligned with the three-dimensional map database, e.g. comprising a high-resolution ground map for example generated by photography or other imaging. The more reflective features, e.g. surfaces and/or edges, that can be used to align with the three-dimensional map, the more accurate vehicle three-dimensional position and/or, velocity can be determined.

In some embodiments, the radar return image(s) may be SAR or ISAR images. In other embodiments, the three-dimensional map may be an optical image.

In other embodiments, the three-dimensional map database comprises multiple views of a similar path. Reflective features, e.g. corners, sharp angles, or certain materials, can be overlaid on a high-resolution ground map or image. Using image processing techniques, e.g. edge detection, the reflective features of radar return image(s) can be aligned with one or more views of the three-dimensional map database. Once the radar return image(s) are correlated with data in the three-dimensional map database, algorithms are used to determine vehicle's three-dimensional position and/or velocity.

In other embodiments or in combination of the above embodiment, the three-dimensional map database comprises past radar return images collected by vehicle(s) flying similar routes. Each vehicle periodically, e.g. every second, captures radar return images during its travel over such routes and is aware of its location and attitude when doing so. Thus, each radar return image can be used to determine the distance of the obstacles (corresponding to radar return signals) from a vehicle, and the location of the obstacles (or surfaces thereof). These past radar return images can be used individually or in combination as templates in the three-dimensional map database that are then correlated with commonly used-image recognition pattern matching algorithms as the vehicle is flying. Once the radar return image is correlated to a past radar return image (or an amalgamation of past radar return images), angular offset information (e.g. based on vehicle attitude and/or radar beam angle) and radar distance information are used to determine three-dimensional position and velocity of the vehicle. In one embodiment, the position of the vehicle can be determined by determining the distance of the vehicle from one or more obstacles (or surfaces thereof), e.g. using triangulation. Optionally, this technique may be also used to determine velocity and/or attitude of the vehicle.

By determining three-dimensional positions of the vehicle at two successive times, the navigation system 107 is also configured to determine vehicle velocity. Based upon vehicle three-dimensional position and velocity, the navigation system 107 is also configured to determine if the vehicle 101 is on a collision course with an obstacle 109. If the vehicle 101 is on a collision course with an obstacle 109 detected by the radar(s), then the navigation system 107 is configured to control the flight controls and actuators 108 to change the course of the vehicle 101 to avoid collision with the obstacle 109.

In the example shown in FIG. 1, the communications system 110 is coupled to the navigation system 107. The communications system 110 can include one or more respective computing circuits, such as a microprocessor or microcontroller, and respective other circuits, such as peripheral circuits and sensors. The computing circuits and other circuits can be configured with firmware or other configuration data, programmed with software, or hardwired to perform certain functions and tasks related to the flying, monitoring, flight-application processing, and maintenance of the vehicle 101. For example, each of one or more of the computing circuits can execute one or more software applications to implement the functions of the corresponding subsystem. Although not shown in FIG. 1, the communication system 110 optionally includes an Aeronautical Operation Control ("AOC") data engine, which is configurable by a loadable AOC database (not shown in FIG. 1), and which provides the communications system 110 with the ability to communicate with systems, subsystems, and human/machine interfaces (both onboard and off board the vehicle 101). For example, the communications system 110 can be configured receive and transmit data to other locations as further described elsewhere herein.

Figure 2:
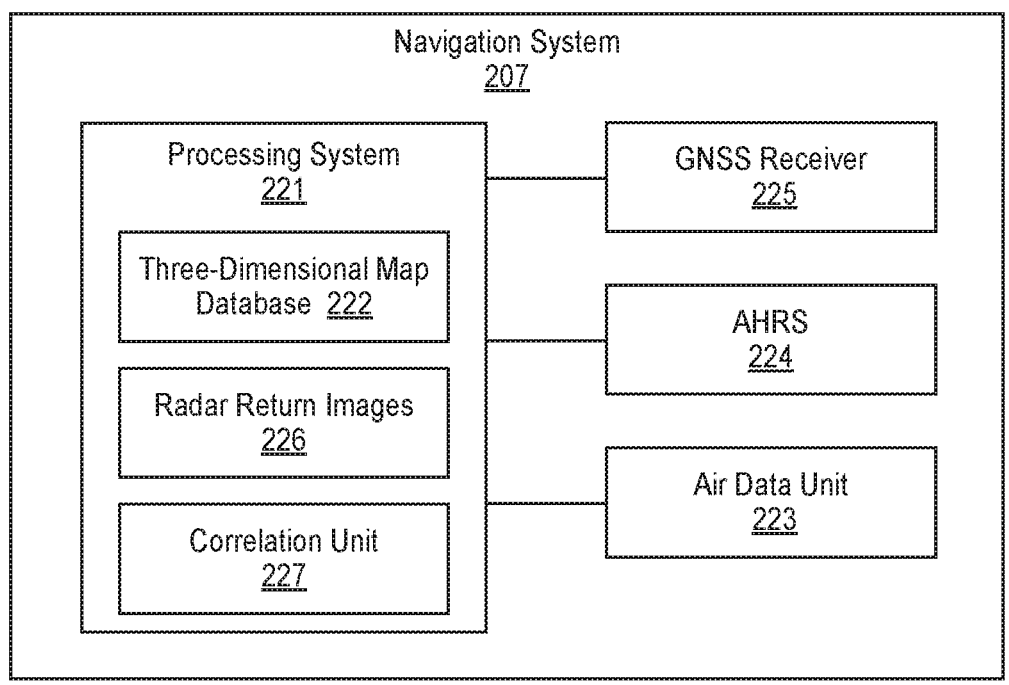
FIG. 2 is a block diagram illustrating an example navigation system within a vehicle.

FIG. 2 is a block diagram of one example of a navigation system 207. The description of components with similar names and numbering (i.e. the navigation system 207) applies to the previous iterations of the components, and vice versa.

The navigation system 207 is configured to operate on and/or in the vehicle 101. The navigation system 207 uses radar return image(s) in conjunction with three-dimensional maps to assist with navigation of the vehicle 101. The navigation system 207 includes a processing system 221 including a three-dimensional map database 222 and coupled to a GNSS receiver 225. For example, the GNSS receiver 225 may be a GPS receiver. The processing system 221 is configured to be coupled to radar(s) (e.g. the forward-facing radar 102 and the downward-facing radar 104), and the flight controls and actuators 108.

Optionally, the navigation system 207 includes an air data unit 223 and/or an AHRS 224 which are coupled to the processing system 221. The air data unit 223 is configured to provide data to the processing system 223 about the vehicle's altitude above the ground or sea level. The AHRS 224 is configured to provide data to the processing system 223 system about heading and attitude (including roll, pitch, and yaw) of the vehicle 101; such information can be used to determine vehicle three-dimensional position and velocity. An AHRS 224 is typically much less expensive than an IMU. Attitude of the vehicle 101 means the orientation of the vehicle 101 with respect to the inertial frame of reference of the three-dimensional map database 222 (e.g. with respect to the Earth).

The processing system 221 is configured receive data about the three-dimensional position, attitude, and/or velocity of the vehicle from the GNSS receiver 225, and possibly the air data unit 223 and/or the AHRS 224. When available, this data can be used to determine at least the three-dimensional position and/or velocity of the vehicle 101. Based upon knowing the three-dimensional position of the vehicle 101, the processing system 221 can guide the vehicle 101 so that it does not collide with an obstacle 109, e.g. a building, identified in the three-dimensional map database 222 and/or in radar return image(s). To do so, the processing system 221 is configured generate control signals. The flight control actuators 108 are configured to be coupled to the processing system 221 and to receive the control signals. With knowledge of the vehicle's three-dimensional position, the navigation system 207 can modify the velocity, and thus the future three-dimensional position, of the vehicle 101 to avoid collision(s) with obstacle(s).

The vehicle 101 primarily uses the GNSS receiver 225 to determine its three-dimensional position and velocity. Optionally, the processing system 221 can determine three-dimensional position and velocity using both three-dimensional position data from the GNSS receiver 225 and three-dimensional position data derived by correlating radar return image(s) with the three-dimensional map database 222; the three-dimensional position data from the GNSS receiver 225 can be used to determine which data in the three-dimensional map database 222 should be correlated with the radar return image(s) so as to more efficiently determine position using the radar return image(s). Using data from both the GNSS receiver 255 and the aforementioned correlation can be used to generate more accurate three-dimensional position and/or velocity data, and/or to identify obstacles 109 not present in the three-dimensional map database 222. A combination of GNSS receiver position data and position data using correlation of radar return images may be used, e.g. with Kalman filters in and executed by the processing system 221, to more accurately determine three-dimensional position and/or the velocity of the vehicle 101. Also, the radar(s) may be used to detect and avoid collisions with objects 109 not identified in the three-dimensional map database. Upon determining the three-dimensional positions of the surfaces of newly detected stationary objects, e.g. buildings or other structures, such information can be added to the three-dimensional map database 222; updating the three-dimensional map database will be subsequently described.

Optionally, data from the correlation of measured radar return images with the three-dimensional map database 222, the GNSS receiver 225, and even from the air data unit 223 and/or the AHRS 224 may be combined to more accurately determine the position, velocity, and attitude of the vehicle 101. Optionally, Kalman filter(s) in and executed by the processing system 223 may be utilized to more accurately obtain such three-dimensional position and/or the velocity of the vehicle 101. By more accurately determining three-dimensional position and velocity of a vehicle, the subsequently described margin of error may be reduced. Thus, more vehicles using this technique can travel in the same region, e.g. air space.

As discussed above GNSS signals may be diminished by various mechanism. If the GNSS signals are diminished (e.g. one or more satellite signals are lost), the accuracy of the position and velocity data provided by the GNSS receiver 225 are diminished and is neither accurate enough to be relied upon to avoid a collision with an obstacle nor will it be able to safely land. The vehicle may crash, e.g. by running out of power when trying to determine its position using GNSS position data. Embodiments of the invention mitigate these risks, particularly in urban environments.

Thus, if for example, an accuracy level of the GNSS receiver 225 is diminished, e.g. below a predefined threshold so that the navigation cannot sufficiently accurately determine its location, the navigation system 207 can utilize correlation of radar return image(s) with the three-dimensional map database 222 (in lieu of or in conjunction with other position determining systems such as a GNSS receiver) to determine the position of the vehicle 201.

For example, the correlation of radar return image(s) with the three-dimensional map database 222 can be used to validate the GNSS position on a map and to determine the accuracy level of the GNSS receiver 225. For example, SAR or ISAR images can be correlated to an optically imaged map. When signals are degraded due to lost satellite signals, the GNSS receiver 225 can determine the accuracy of its three-dimensional position data and/or its velocity data. The predefined threshold may be determined by a system designer and/or by regulation. The three-dimensional position data from the GNSS receiver 225 last received when the accuracy level is less than the predefined level can be used to ascertain which portion of the three-dimensional map database 222 should be initially compared to the radar return image(s).

The radar(s) are configured to be coupled to a processing system 221. When utilized, each radar is configured to periodical provide at least one radar return image to the processing system 221. The processing system 221 is configured to receive each of such at least one radar return images. The processing system 221 is configured to correlate each set of periodically provided radar return images with the three-dimensional map database 222, and to attempt to determine the three-dimensional position and the velocity of the vehicle 101.

The processing system 221 comprises processing circuitry coupled to memory circuitry. The processing system 221 may be implemented with analog and/or digital circuitry. For example, the processing circuitry may be implemented with electronic analog circuitry, including circuitry used to implement electronic analog computers. In some examples, the processing system 221 is configured to correlate the output of radar(s) with data of the three-dimensional map database 222, the air data unit 223, the AHRS 224, and the GNSS receiver 225. In some examples, the processing system 221 is incorporated into the other components within the navigation system 207.

The three-dimensional map may or may not be stored in memory circuitry of the processing system 221. In some examples, the three-dimensional map database (also hereinafter referred to as "map database") 222 comprises one or more of the following types of maps:

(a) radar return images of surfaces of object(s) mapped in three-dimensions as elevation scans, e.g. using monopulse and/or SAR processing;

(b) overlays of different radar return images (e.g. from SARs or ISARs) from different perspectives, e.g. along one or more known routes (with known location and altitude information), that would be measured by radar(s), e.g. in an urban environment. The different overlays may be collected by one or more vehicles. Such information may be shared directly or indirectly (e.g. through a cloud or server computing system) from vehicle(s) with other vehicle(s); and (c) several two-dimensional latitude-longitude maps at different altitudes;

In other examples, the three-dimensional map database 222 is periodically created with radar image returns from by one or more radars stationary in or moving around an environment, e.g. urban environment. For example, a vehicle such as that described with respect to FIGS. 1 and 2 may be used to periodically generate radar return images of the environment and to periodically create a three-dimensional map database. Optionally, the periodically created three-dimensional map database is stored in a computer system (e.g. a server system or cloud computing system) outside of the vehicle 101 and is uploaded periodically to the vehicle 101.

In some examples, the three-dimensional map database 222 can be updated by the processing system 221 with radar return images generated by radar(s) on the vehicle 101, and optionally in conjunction with information from the components on the vehicle 101. In one example, when the vehicle 101 travels, the radar(s) sense the environment about the vehicle 101. The processing system 221 may not only determine position of a vehicle 101 based upon correlation (or alternatively position data is determined using data from other component(s) such as the GNSS receiver 225), but also can identify an obstacle in radar return image(s) not included in the map database 222. When radar(s) detect an object not found in the map database 222, the navigation system 207 can determine whether the object is stationary in position or moving, e.g. another moving vehicle. For example, this can be achieved by evaluating whether the object is moving by determining if its absolute position changes over time or by evaluating the Doppler shift of radar return signal(s) reflected by the object. Cooperative systems, e.g. data from a traffic collision avoidance system and/or an automatic dependent surveillance-broadcast, can be combined with the three-dimensional map database to assist in determination as to whether an object is moving or not. If the object is stationary, the navigation system 207 can add information about the obstacle, e.g. the radar return image of the obstacle, to a three-dimensional map database 222 and/or as an alert or a notification to an internal or external system that a new stationary object has been located. Subsequently, when the vehicle 101 travels near the object at another time, the navigation system 207 can plan in advance a path of the vehicle 101 that circumvents the object. Further, the navigation system 207 can communicate the updated three-dimensional map database (or just a change to the three-dimensional map database 222 corresponding to the object) with other vehicles and/or a central map database, e.g. in a server or cloud computer system, so that other vehicles can use such data for navigation.

In the example shown in FIG. 2, the radar return images 226 are stored within the processing system 221. It is understood that the radar return images 226 can be stored within another system within the vehicle and/or within an external system. In some examples, the radar return images 226 are stored in memory circuitry. The radar return images 226 comprise radar return signals from the radars 102, 104 that have been processed to create images of the environment surrounding the vehicle 101.

In the example shown in FIG. 2, the correlation unit 227 is also stored within the processing system. The correlation unit 227 is configured to compare and correlate the radar return images 226 with the three-dimensional map database 222. If the correlation unit 227 identifies an obstacle in a radar return image that is not found in the three-dimensional map database 222, the correlation unit 227 or another component of the navigation system 207 can add the obstacle to the three-dimensional map database 222.

In the example shown in FIG. 2, the air data unit 223 is configured to be coupled to the processing system 221 and to provide an altitude of the vehicle 101, and optionally a rate of change of the altitude of the vehicle 101. In some examples, the air data unit 223 comprises a baro-altimeter which provides information about the altitude above ground or sea level of the vehicle 101 based the barometric pressure measured by the baro-altimeter. In some examples, the known altitude of the vehicle 101 reduces number of comparisons of the radar return image(s) with the three-dimensional map database, as one of the three axes is known. For example, while the air data unit 223 determines that the altitude of the vehicle 101 is above a maximum altitude of all obstacles in a region in which the vehicle 101 is travelling (or above a maximum altitude plus an offset amount), then the navigation system 207 and the processing system 221 need not utilize data from radar(s) 202, 204 in performance of a navigation function. The offset value may be used to account for a margin of error in measurement data from the air data unit 223. Furthermore, if the vehicle does not detect obstacles in its path, e.g. the vehicle is above a maximum altitude of all obstacles, the navigation system 207 can be configured to adjust scanning strategy, e.g. to focus on detecting and avoiding other moving objects or switch to long range scanning and/or mapping.

In the example shown in FIG. 2, AHRS 224 provides information to the other components about the attitude and heading of the vehicle 207. In some examples, the AHRS 224 includes at least one accelerometer, at least one gyroscope, and at least one magnetometer. Each accelerometer measures acceleration along an axis. Each gyroscope measures angular rotation around an axis. Each magnetometer determines direction of an ambient magnetic field. The data from the AHRS 224 may be used to determine that attitude of the vehicle 101, and thus the orientation of radar(s) on the vehicle 101 with respect to the three-dimensional database 222.

When the vehicle 101 is oriented off axis, the radar return image must be corrected with attitude information before correlation with the three-dimensional map database 222. The processing system 221 uses the output of the inertial measurement unit 224 to determine the attitude and/or heading of the vehicle 101 with respect to the inertial frame of reference of the three-dimensional map database 222 (e.g. with respect to the Earth) and align the radar return image with the three-dimensional map database 222 so that they have the same frame of reference.

Optionally, data from the AHRS 224, the GNSS receiver 225, the air data unit 223, the correlation of measured radar return images with the map database 222 may be combined to more accurately determine the three-dimensional position, velocity, and attitude of the vehicle 101. Optionally, Kalman filter(s) executed on the processing system 223 may be utilized to obtain more accurate results.

In the example shown in FIG. 2, the GNSS receiver 225 is configured to provide the three-dimensional position, and optionally the velocity, of the vehicle 101 and time when adequate signals from the GNSS are available. When the vehicle 101 is within an urban environment, GNSS satellite reception may be diminished. Thus, the three-dimensional position of the vehicle 101 provided by the GNSS receiver 225 may not be accurate or unavailable. When deprived of accurate three-dimensional position data, e.g. from the GNSS receiver 225, the navigation system 207 relies upon correlating the radar return images with the map database 222 to obtain such information. Three-dimensional position data is determined using three-dimensional position data derived from the correlation process alone or in conjunction with other data such as three-dimensional position data from the GNSS receiver 225.

For example, when the accuracy of the three-dimensional position data from GNSS receiver 225 is determined to exceed a threshold level, the navigation system 207 relies upon such correlation to determine vehicle position, trajectory, and/or velocity, and thus vehicle navigation guidance. Optionally, when the accuracy of the position data of the GNSS receiver 225 exceeds the threshold level, the navigation system 207 may use a combination of other data, e.g. from the GNSS receiver 225, the air data unit 223, and/or the AHRS 224, with the three-dimensional position data derived from the radar image return correlation(s), e.g. using Kalman filters, to determine vehicle three-dimensional position and/or velocity. For illustrative purposes only, the threshold level may be one meter, and the accuracy of the position data may be two meters; in such a case, the accuracy exceeds the threshold level. Thus, the vehicle 101 may be guided using this data from more than one sensor on the vehicle 101.

If, optionally, the navigation system 207 does not include a GNSS receiver 225 (or if the GNSS receiver 225 is not functioning), the aforementioned options of utilizing radar return image correlations or the combination of other data (e.g. from the air data unit 223 and/or the AHRS 224) with radar return image correlations may be used to determine vehicle three-dimensional position and/or velocity. Thus, the vehicle 101 may be guided using this data from more than one sensor (excluding a GNSS receiver 225) on the vehicle 101.

In the example shown in FIG. 2, the flight controls and actuators 226 are configured to be coupled to the processing system 221, and to affect a change of velocity and thus position of the vehicle 101. The flight controls and actuators 226 include, for example, control surface(s) of the vehicle 101 and propulsion system(s) of the vehicle 101, and systems for controlling the foregoing. The control surfaces may include wheel(s), elevator(s), aileron(s), and/s rudder(s). The propulsion systems may include electric motors and/or engines coupled to propellers.

The vehicle 101 may be autonomously controlled by the navigation system 207 as described above. In this case, the flight controls and actuators 226 receive information from the processing system 221 to control the velocity and attitude of the vehicle 101. As a result, the navigation system 207 can maneuver the vehicle 101 to an intended destination but away from an obstacle 109 with which the vehicle 101 is on a collision path. For example, the obstacle 109 may be detected by radar(s).

Alternatively, the vehicle 101 may be controlled by a human operator(s), e.g. pilot(s). When the vehicle 101 is operated by a human pilot(s), the flight controls and actuators 226 are accessible to the human operator(s) and may also include displays. The human operator(s), and thus the displays, may be in the vehicle 101 or remotely located from the vehicle such as on the ground or in another vehicle. Such displays display data such as vehicle position, obstacle positions near the vehicle 101, velocity, attitude, etc. Such position information may include altitude and/or lateral position. Further, the flight controls and actuators 226 include controls, such as pedal(s), stick(s), and/or yoke(s) for the human operator(s) to provide input to control the position, velocity, and attitude of the vehicle 101.

Figure 3:
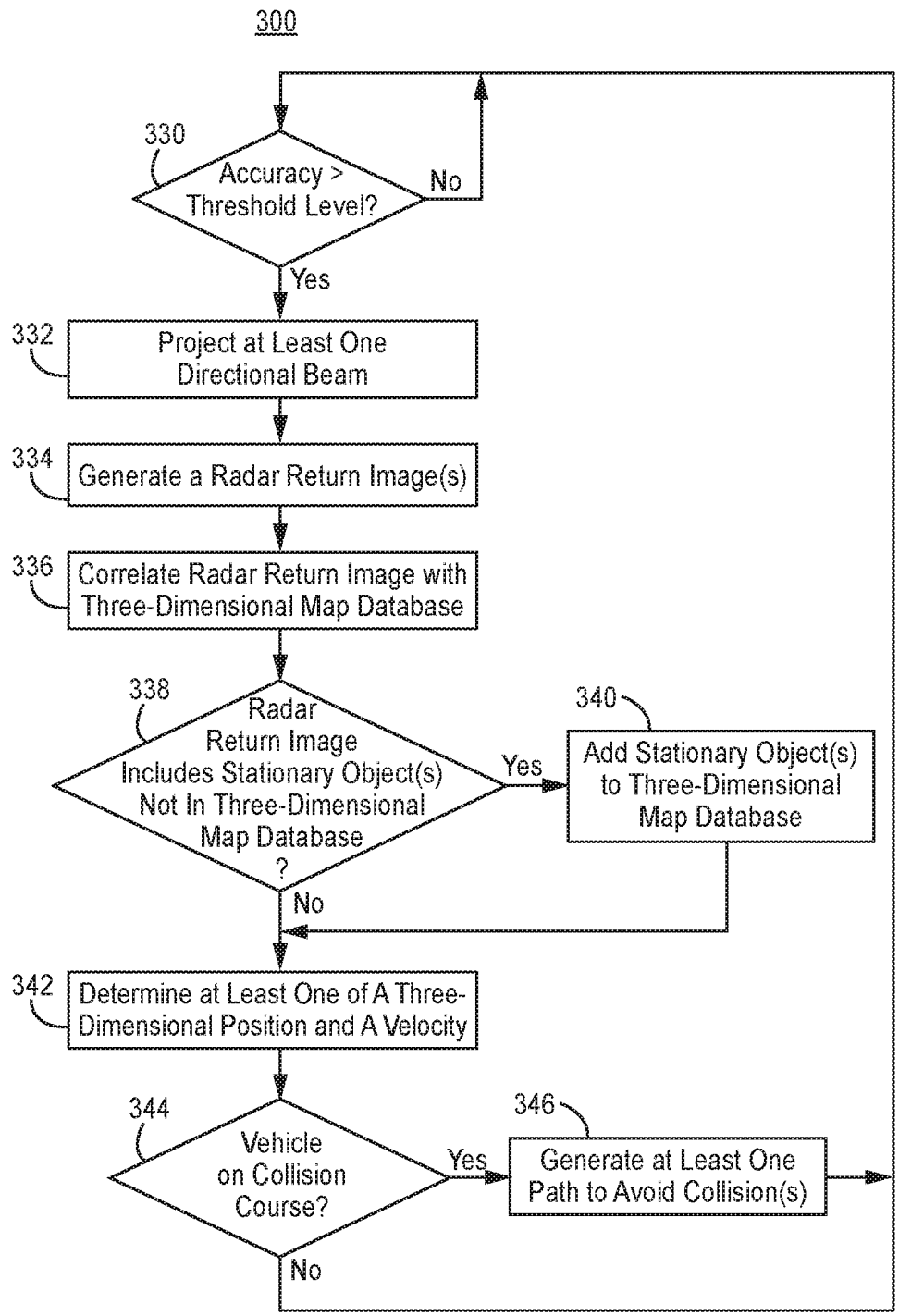
FIG. 3 is a flow chart illustrating a method according to one embodiment of the present disclosure.

FIG. 3 illustrates an exemplary process 300 for performing vehicle position determination using at least one radar. The process 300 is illustrated in FIG. 3 and described herein as comprising discrete elements. Such illustration is for ease of description and it should be recognized that the function performed by these elements may be combined in one or more components, e.g. implemented in software and/or hardware.

To the extent the method 300 shown in FIG. 3 is described herein as being implemented in the devices described above with respect to FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Optionally, in block 330, determine if a three-dimensional position accuracy determined by at least one sensor (excluding radar) on a vehicle exceeds a threshold level. The at least one sensor may be a GNSS receiver 225 and/or an air data unit 223. For example, if the accuracy of the three-dimensional position exceeds the threshold level, then the at least one sensor (excluding radar) may not be able to safely navigate the vehicle. If the three-dimensional position accuracy does not exceed the threshold level, then return to block 330. If the three-dimensional position accuracy exceeds a threshold level, then proceed to block 332.

In block 332, project at least one directional beam from at least one radar on the vehicle, where each radar periodically emits a radar signal in each directional beam and may receive a radar return signal in the directional beam. Optionally, scan at least a portion of a field of regard of at least one radar with at least one of the at least one directional beam. For example, a single radar (such as a forward-facing radar) may scan a directional beam using progressive scanning. However, other scanning techniques may be used, such as interlaced scanning of two directional beams emitted by one or more radars. If the directional beam is not scanned, then for example the directional beam may be fixedly pointed, at least for a period of time, at a specific region in the field of regard of the radar which can provide obstacle detection in the corresponding field of view and determination of distance from the obstacle.

In block 334, generate at least one radar return image from the reflected radar signals in the at least one directional beam for the corresponding at least a portion of the field of regard of a corresponding radar for a period of time T. Optionally, the navigation system determines the portion(s) of the field of regard to be imaged by a radar.

For example, if the directional beam is being scanned, the radar return image may be formed over N scans of the selected at least a portion of the field of regard during time period T, where N is an integer greater than zero. In some examples, the radar(s) and/or the navigation system generates the radar return image from the radar return signals In block 336, correlate at least one radar return image with a three-dimensional map database, e.g. using image processing techniques. The radar return image is correlated to the three-dimensional map database to ascertain whether the radar return image data is statistically similar to a region of the three-dimensional map database. Optionally, correlation may be more efficiently performed if the position of the vehicle can be estimated based upon past correlations and/or data from other components as described above. Optionally, the location can be more accurately determined when using data from other components as described above.

Optionally, in block 338, determine if the radar return image includes at least one stationary object not included in the three-dimensional map database. If the radar return image includes at least one stationary object not included in the three-dimensional database, then in optional block 340, add the at least one stationary object to the three-dimensional map database, and continue to block 342. If the radar return image does not include at least one stationary object not included in the three-dimensional map database, then continue to block 342.

In block 342, determine at least one of a three-dimensional position and a velocity of the vehicle using the correlation. Determine the three-dimensional position by determining the vector distance of the vehicle from three-dimensional locations of surfaces of obstacles determined to be proximate to the vehicle by the correlation. The three-dimensional position of the vehicle is determined more accurately by accounting for the attitude of the vehicle and the distance of the vehicle from sensed objects. The attitude of the vehicle can be determined, for example, with an AHRS. The vector distance from a surface of an obstacle proximate to the vehicle can be determined with radar(s), e.g. based upon the one half of the time between transmission of a radar signal and reception of the corresponding radar return signal. The velocity can be calculated by determining the change in three-dimensional position from the last calculated three-dimensional position and the current three-dimensional position, divided by the time between the two position determinations.

Optionally, in block 344, determine if the vehicle is on a collision course with at least one obstacle, e.g. detected in at least one radar return image. This is accomplished by determining the future path of the vehicle based upon its current velocity, and whether there is an obstacle in the future path. The obstacle(s) may be sensed by radar(s) on the vehicle and/or in the map database in the vehicle. The location of obstacle(s) sensed by radar(s), but not in the map database, can be determined based upon vehicle position and attitude, one half of the time delay between transmitting a radar signal and the radar signal reflected from each object, and the radar beam angle at which the object is detected Because the vehicle position and velocity, and obstacle positions are known or determined, obstacle(s) in the trajectory of the vehicle can be readily determined. In some examples, the trajectory of the vehicle includes area volume around the vehicle which represents the volume of the vehicle and/or a margin of error. Thus, determining a collision course comprises determining if the volume will intersect at least one obstacle.

In some embodiments, the at least one obstacle are stationary obstacle(s). However, in other embodiments, the at least one obstacle are stationary and moving obstacle(s).

In such embodiments, determine the path of the moving obstacles and whether any of the moving obstacles will collide with the vehicle.

In block 346, if the vehicle is determined to be on a collision course with at least one obstacle, optionally in block 346 generate at least one path to avoid collision(s) with at least one obstacle. Optionally, select one path and change the path of travel of the vehicle to avoid the such obstacle(s) by following the selected path. This is accomplished, e.g. by increasing or decreasing vehicle altitude, changing vehicle lateral position, changing vehicle speed, and/or changing vehicle direction. Practically, the foregoing is affected by manually and/or automatically changing the vehicle's flight controls and actuators. When the vehicle is automatically controlled, a navigation system (in or not in the vehicle) generates control signals to change the vehicle's flight controls so that the vehicle automatically avoids collisions.

Optionally, when the vehicle is manually controlled, the navigation system alerts the vehicle operator(s), e.g. projects the at least one path on a display to be viewed by vehicle operator(s), e.g. pilot(s). The vehicle operator(s) can adjust the path of the vehicle to follow one of the at least one paths to avoid collision(s). In another embodiment, in lieu of or in addition to the forgoing embodiment, a navigation system (in or not in the vehicle) may generate control signals to change the vehicle's flight controls so that the vehicle automatically avoids collision(s), e.g. when the vehicle operator(s) have not diverted the vehicle from such collision(s). One example of a collision avoidance would be a short vertical ascent or descent if the area above and/or below the vehicle is unobstructed. Optionally, then return to blocks 330 or 332. If the vehicle is determined not to be on a collision course, then optionally return to blocks 330 or 332.

EXAMPLE EMBODIMENTS

Example 1 includes a method of determining location of an airborne vehicle in an urban environment, comprising: emitting, from the airborne vehicle, at least one radar signal in the urban environment; receiving, at the airborne vehicle, a radar return signal reflected from at least one surface of an obstacle in the urban environment; comparing a radar return image, formed by the radar return signal, with a map database corresponding to the urban environment; determining a three-dimensional location of the airborne vehicle based upon a correlation of the radar return image with the map database; determining if the airborne vehicle will collide with an obstacle; and if it is determined that the airborne vehicle will collide with an obstacle, changing the direction of travel of the airborne vehicle to avoid colliding with the vehicle.

Example 2 includes the method of Example 1, wherein the at least one radar signal is emitted by at least one of a phased array radar, a synthetic aperture radar, and an inverse synthetic aperture radar.

Example 3 includes the method of Example 1, wherein the map database is stored in the vehicle.

Example 4 includes the method of Example 1, wherein the at least one radar signal comprises at least two radar signals configured to be directed in different directions.

Example 5 includes the method of Example 1, wherein the obstacle is a man-made structure.

Example 6 includes a system comprising: a Global Navigation Satellite System (GNSS) receiver configured to receive signals from satellites of the GNSS and to be installed on a vehicle; a processing system comprising processor circuitry coupled to memory circuitry, where the memory circuitry comprises a three-dimensional map database; wherein the processing system is configured to: receive at least one radar return image; correlate the at least one radar return image with a three-dimensional map database; and determine, based upon the correlation, at least one of a three-dimensional position and a velocity of the vehicle.

Example 7 includes the system of Example 6, further comprising an attitude and heading reference system (AHRS) comprising at least one accelerometer, at least one gyroscope, and at least one magnetometer.

Example 8 includes the system of Example 7, wherein the processing system is further configured, using attitude information from the AHRS, to adjust orientation of the at least one radar return image to match the orientation of the three-dimensional map database.

Example 9 includes the system of Example 6, further comprising a baro-altimeter.

Example 10 includes the system of Example 6, wherein the processing system is further configured to: determine if the at least one radar return image includes at least one stationary object not in the three-dimensional map database; if the at least one radar return image includes the at least one stationary object not in the three-dimensional map database, then add the at least one stationary object to the three-dimensional map database.

Example 11 includes the system of Example 6, wherein the processing system is further configured to: determine if the vehicle will collide with at least one object detected in the at least one radar return image; and if it is determined that the vehicle will collide with the at least one object, then generate at least one path to avoid such a collision.

Example 12 includes the system of Example 6, wherein the vehicle is an autonomous airborne vehicle.

Example 13 includes the system of Example 6, wherein the processing system is further configured to: determine if accuracy of position data provided by the GNSS receiver is greater than a threshold level; and only if the accuracy of the position data is greater that the threshold level, then have the processing system: receive the at least one radar return image; correlate the radar return image with the three-dimensional map database; and determine, based upon the correlation, at least one of the three-dimensional position and the velocity of the vehicle.

Example 14 includes the system of Example 6, further comprising at least one phased array radar configured to emit at least one directional beam, where a radar signal is emitted and a radar return signal may be received in each directional beam.

Example 15 includes a method, comprising: projecting at least one directional beam from at least one phased array radar, where a radar signal is emitted and a radar return signal may be received in each directional beam; generating at least one radar return image from at least one radar return signal; correlating the radar return image with a three-dimensional map database; and determining at least one of a three-dimensional position and a velocity of a vehicle based upon the correlation.

Example 16 includes the method of Example 15, further comprising: determining, utilizing Kalman filtering, the three-dimensional position of the vehicle based upon the three-dimensional position of the vehicle using the three-dimensional positions of the vehicle determined by each of the correlation and a Global Navigation Satellite System (GNSS) receiver.

Example 17 includes the method of Example 15, further comprising: determining if the radar return image includes at least one stationary object not in the three-dimensional map database; if the radar return image includes the at least one stationary object not in the three-dimensional map database, then adding the at least one stationary object to the three-dimensional map database.

Example 18 includes the method of Example 15, further comprising: determining if the vehicle will collide with at least one object detected in the at least one radar return image; and if it is determined that the vehicle will collide with the at least one object, then generating at least one path to avoid such a collision.

Example 19 includes the method of Example 18, further comprising if it is determined that the vehicle will collide with the at least one object, then providing an alert to at least one vehicle operator.

Example 20 includes the method of Example 15, further comprising: determining if the accuracy of position data provided by a GNSS receiver is greater than a threshold level; and only if the accuracy of the position data is greater that the threshold level, then: projecting the at least one directional beam from the at least one phased array radar; generating the at least one radar return image from the at least one radar return signal; correlating the radar return image with the three-dimensional map database; and determining the three-dimensional position and a velocity of the vehicle based upon the correlation.

Although specific embodiments have been illustrated and escribed herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of determining location of an airborne vehicle in an environment, comprising:
   emitting, from the airborne vehicle, at least one radar signal in the environment;
   receiving, at the airborne vehicle, a radar return signal reflected from at least one surface of an obstacle in the environment;
   comparing a radar return image, formed by the radar return signal, with a map database corresponding to the environment;
   determining a three-dimensional location of the airborne vehicle based upon a correlation of the radar return image with the map database;
   determining if the airborne vehicle will collide with the obstacle based upon the three-dimensional location; and
   if it is determined that the airborne vehicle will collide with the obstacle, then changing a direction of travel of the airborne vehicle to avoid colliding with the obstacle.

2. The method of claim 1, wherein the at least one radar signal is emitted by at least one of a phased array radar, a synthetic aperture radar, and an inverse synthetic aperture radar.

3. The method of claim 1, wherein the map database is stored in the airborne vehicle.

4. The method of claim 1, wherein the at least one radar signal comprises at least two radar signals configured to be directed in different directions.

5. The method of claim 1, further comprising:
   determining if accuracy of position data provided by a Global Navigation Satellite System (GNSS) receiver, configured to be installed on the airborne vehicle, is greater than a threshold level; and
   only if the accuracy of the position data is determined to be greater that the threshold level, then perform:
     emitting, from the airborne vehicle, the at least one radar signal in the environment;
     receiving, at the airborne vehicle, the radar return signal reflected from at least one surface of the obstacle in the environment;
     comparing the radar return image, formed by the radar return signal, with the map database;
     determining the three-dimensional location of the airborne vehicle based upon the correlation of the radar return image with the map database;
     determining if the airborne vehicle will collide with the obstacle based upon the three-dimensional location; and
     if it is determined that the airborne vehicle will collide with the obstacle, then causing a direction of travel of the airborne vehicle to change to avoid colliding with the obstacle.

6. A system comprising:
   a processing system comprising processor circuitry coupled to memory circuitry, where the memory circuitry comprises a three-dimensional map database;
   wherein the processing system is configured to:
     receive at least one radar return image at an airborne vehicle;
     determine a three-dimensional location of the airborne vehicle by correlating the at least one radar return image with the three-dimensional map database;
     determine if the airborne vehicle will collide with an obstacle based upon the three-dimensional location; and
     if it is determined that the airborne vehicle will collide with the obstacle, then cause a direction of travel of the airborne vehicle to change to avoid colliding with the obstacle.

7. The system of claim 6, further comprising an attitude and heading reference system (AHRS) configured to be installed on the airborne vehicle and comprising at least one accelerometer, at least one gyroscope, and at least one magnetometer.

8. The system of claim 7, wherein the processing system is further configured, using attitude information from the AHRS, to adjust orientation of the at least one radar return image to match the orientation of the three-dimensional map database.

9. The system of claim 6, further comprising a baro-altimeter configured to be installed on the airborne vehicle.

10. The system of claim 6, wherein the processing system is further configured to:
    determine if the at least one radar return image includes at least one stationary object not in the three-dimensional map database; and
    if the at least one radar return image includes the at least one stationary object not in the three-dimensional map database, then add the at least one stationary object to the three-dimensional map database.

11. The system of claim 6, further comprising a Global Navigation Satellite System (GNSS) receiver configured to receive signals from satellites of a GNSS and configured to be installed on the airborne vehicle;
    wherein the processing system is further configured to:
      determine if accuracy of position data provided by the GNSS receiver is greater than a threshold level; and only if the accuracy of the position data is determined to be greater that the threshold level, then have the processing system:
- receive the at least one radar return image;
- determine the three-dimensional location of the airborne vehicle by correlating the at least one radar return image with the three-dimensional map database;
- determine if the airborne vehicle will collide with the obstacle based upon the three-dimensional location; and
- if it is determined that the airborne vehicle will collide with the obstacle, then cause a direction of travel of the airborne vehicle to change to avoid colliding with the obstacle.

12. The system of claim 6, further comprising at least one phased array radar configured to emit at least one directional beam and configured to be installed on the airborne vehicle.

13. A method, comprising:
- projecting at least one directional beam from at least one phased array radar on an airborne vehicle;
- generating at least one radar return image from at least one radar return signal;
- determining a three-dimensional location of the airborne vehicle by correlating the at least one radar return image with a three-dimensional map database;
- determining if the airborne vehicle will collide with an obstacle based upon the three-dimensional location; and
- if it is determined that the airborne vehicle will collide with an obstacle, causing a direction of travel of the airborne vehicle to change to avoid colliding with the obstacle.

14. The method of claim 13, further comprising:
- determining, utilizing Kalman filtering, a three-dimensional position of the airborne vehicle based upon three-dimensional locations of the airborne vehicle determined by each of the correlation and a Global Navigation Satellite System (GNSS) receiver configured to be installed on the airborne vehicle.

15. The method of claim 13, further comprising:
- determining if the at least one radar return image includes at least one stationary object not in the three-dimensional map database; and
- if the at least one radar return image includes the at least one stationary object not in the three-dimensional map database, then adding the at least one stationary object to the three-dimensional map database.

16. The method of claim 13, further comprising if it is determined that the airborne vehicle will collide with the obstacle, then providing an alert to at least one vehicle operator.

17. The method of claim 13, further comprising:
- determining if accuracy of position data provided by a Global Navigation Satellite System (GNSS) receiver, configured to be mounted on the airborne vehicle, is greater than a threshold level; and
- only if the accuracy of the position data is determined to be greater that the threshold level, then:
  - projecting the at least one directional beam from the at least one phased array radar;
  - generating the at least one radar return image from the at least one radar return signal;
  - determining the three-dimensional location of the airborne vehicle by correlating the at least one radar return image with the three-dimensional map database;
  - determining if the airborne vehicle will collide with the obstacle based upon the three-dimensional location; and
  - if it is determined that the airborne vehicle will collide with the obstacle, then cause the direction of travel of the airborne vehicle to change to avoid colliding with the obstacle.

* * * * *